(12) United States Patent
Hu

(10) Patent No.: US 9,056,647 B2
(45) Date of Patent: Jun. 16, 2015

(54) ONE-PIECE CONNECTOR FOR A SHOCK-ABSORBING FRAME OF A BICYCLE

(71) Applicant: Samuel Hu, Changhua (TW)

(72) Inventor: Samuel Hu, Changhua (TW)

( * ) Notice: Subject to any disclaimer, the term of this patent is extended or adjusted under 35 U.S.C. 154(b) by 15 days.

(21) Appl. No.: 13/973,771

(22) Filed: Aug. 22, 2013

(65) Prior Publication Data

US 2015/0054250 A1 Feb. 26, 2015

(51) Int. Cl.
*B62K 25/28* (2006.01)
*B62K 25/04* (2006.01)

(52) U.S. Cl.
CPC ............... *B62K 25/04* (2013.01); *B62K 25/28* (2013.01)

(58) Field of Classification Search
CPC ............................. B62K 25/286; B62K 25/28
USPC ....................... 280/284, 281.1, 283
See application file for complete search history.

(56) References Cited

U.S. PATENT DOCUMENTS

| | | | | |
|---|---|---|---|---|
| 5,121,937 | A * | 6/1992 | Lawwill ........................ | 280/284 |
| 5,452,910 | A * | 9/1995 | Harris ........................... | 280/284 |
| 5,553,881 | A * | 9/1996 | Klassen et al. ................ | 280/284 |
| 5,628,524 | A * | 5/1997 | Klassen et al. ................ | 280/284 |
| D398,267 | S * | 9/1998 | Yu et al. ....................... | D12/111 |
| 6,076,845 | A * | 6/2000 | Lawwill et al. ............... | 280/284 |
| 6,102,421 | A * | 8/2000 | Lawwill et al. ............... | 280/284 |
| 6,880,847 | B2 * | 4/2005 | Chamberlain et al. ........ | 280/284 |
| 7,048,292 | B2 * | 5/2006 | Weagle ......................... | 280/285 |
| 7,059,620 | B2 * | 6/2006 | Chamberlain et al. ........ | 280/284 |
| 7,350,797 | B2 * | 4/2008 | Carroll .......................... | 280/284 |
| 7,377,535 | B2 * | 5/2008 | Chamberlain ................. | 280/284 |
| 7,891,688 | B2 * | 2/2011 | Chamberlain ............. | 280/281.1 |
| 7,938,425 | B2 * | 5/2011 | Chamberlain ................. | 280/284 |
| 7,963,541 | B2 * | 6/2011 | Chamberlain ................. | 280/284 |
| 8,201,841 | B2 * | 6/2012 | Beale et al. ................... | 280/284 |
| 8,439,383 | B2 * | 5/2013 | Talavasek ..................... | 280/285 |
| 8,851,498 | B2 * | 10/2014 | Alsop .......................... | 280/284 |
| 2001/0024024 | A1 * | 9/2001 | Klassen et al. ............... | 280/261 |
| 2002/0038944 | A1 * | 4/2002 | Lawwill et al. ............... | 280/284 |
| 2003/0038450 | A1 * | 2/2003 | Lam ............................. | 280/284 |
| 2004/0046355 | A1 * | 3/2004 | Carroll .......................... | 280/284 |
| 2005/0156402 | A1 * | 7/2005 | Carroll .......................... | 280/284 |
| 2008/0303242 | A1 * | 12/2008 | O'Connor .................... | 280/284 |
| 2009/0001686 | A1 * | 1/2009 | Currie ........................... | 280/285 |

* cited by examiner

*Primary Examiner* — Joseph Rocca
*Assistant Examiner* — Michael Stabley
(74) *Attorney, Agent, or Firm* — patenttm.us

(57) ABSTRACT

A one-piece connector for a shock-absorbing frame of a bicycle is manufactured by casting, forging or high pressure hydraulic forming means, is made of aluminum and formed as a single piece without welding, and has a bottom bracket shell, a connecting tube, a pivot and a linking joint. The connecting tube is formed on and protrudes from a top surface of the bottom bracket shell. The pivot is formed with the connecting tube near the bottom bracket shell. The linking joint is formed on an upper end of the connecting tube. The bottom bracket shell, the connecting tube, the pivot and the linking joint are formed with each other to form the one-piece connector without welding to simplify the production process, to improve the precision, quality and appearance of the one-piece connector, and to reinforce the structural strength of the one-piece connector.

1 Claim, 7 Drawing Sheets

ONE-PIECE CONNECTOR FOR A SHOCK-ABSORBING FRAME OF A BICYCLE

BACKGROUND OF THE INVENTION

1. Field of the Invention

The present invention relates to a connector, and more particularly to a one-piece connector for a shock-absorbing frame of a bicycle that can simplify the production process, can improve the precision, quality, and appearance of the product, and can reinforce the structural strength of the one-piece connector.

2. Description of Related Art

With reference to FIG. 7, a conventional shock-absorbing frame 80 of a bicycle has a front frame 81, an upper connecting bracket 83, a lower connecting bracket 84, a rear frame 82 and a shock absorber 85. The front frame 81 has a top tube 811, a head tube 812, a seat tube 813, a connecting tube 814, a bottom bracket shell 815 and a down tube 816. The top tube 811 has a front end and a rear end. The head tube 812 is connected to the front end of the top tube 811. The seat tube 813 is connected to the rear end of the top tube 811 and has a lower end.

The connecting tube 814 is connected to the lower end of the seat tube 813 and has an upper end, a lower end, a front side, a rear side, a linking joint, a cylinder mount 817, a front derailleur and a pivot. The linking joint is formed at the upper end of the connecting tube 814. The cylinder mount 817 is mounted on and protrudes from the front side of the connecting tube 814 between the top tube 811 and the down tube 816. The front derailleur is mounted on the rear side of the connecting tube 814. The pivot is formed at the lower end of the connecting tube 814. The bottom bracket shell 815 is transversally formed on and protrudes from the lower end of the connecting tube 814. The down tube 816 is connected to the head tube 812 and the bottom bracket shell 815.

The upper connecting bracket 83 is pivotally connected to the linking joint of the connecting tube 814. The lower connecting bracket 84 is pivotally connected to the pivot of the connecting tube 814. The rear frame 82 is connected to the upper connecting bracket 83 and the lower connecting bracket 84 and has a seat stay 821, a chain stay 822 and two dropouts 823. The seat stay 821 is connected to the upper connecting bracket 83 and has a front end and two rear ends. The front end of the seat stay 821 is connected to the upper connecting bracket 83. The chain stay 822 is connected to the lower connecting bracket 84 and has a front end and two rear ends. The dropouts 823 are connected to the rear ends of the seat stay 821 and the rear ends of the chain stay 822. The shock absorber 85 is connected to the upper connecting bracket 83 and the lower connecting bracket 84 to provide a shock absorbing effect to the conventional shock-absorbing frame 80.

The conventional shock-absorbing frame 80 of a bicycle can provide a shock absorbing capability by the shock absorber 85 between the connecting brackets 83, 84, but in assembly, the bottom bracket shell 815, the linking joint of the connecting tube 814, the cylinder mount 817, the front derailleur, the pivot of the connecting tube 814 and the connecting tube 814 are connected to each other by a welding process. The welding process for connecting the above-mentioned components of the conventional shock-absorbing frame 80 has the following shortcomings.

1. The above-mentioned components of the conventional shock-absorbing frame 80 are connected to each other sequentially by welding, and this is time-consuming in manufacture and affects the processing efficiency and increases the cost of production.

2. As welding is widely adopted in the manufacturing process, the high temperature of the welding process may cause deformation of the above-mentioned components of the conventional shock-absorbing frame 80. Additionally, since the welding process is operated by individual personnel, processing tolerances are inevitably caused due to varying personal techniques and habits, and this will influence the stability of the product quality.

3. The bottom bracket shell 815, the cylinder mount 817, the pivot, the front derailleur, the linking joint and the connecting tube 814 are connected to each other by welding, and multiple welding points may be formed on the conventional shock-absorbing frame 80, such that the structural strength may be insufficient and the conventional shock-absorbing frame 80 may be broken by the welding defects and this is unsafe in use.

4. After assembling the conventional shock-absorbing frame 80, welding points and marks are formed on the conventional shock-absorbing frame 80 and affect the integrity and aesthetic appearance of the conventional shock-absorbing frame 80.

To overcome the shortcomings, the present invention provides a one-piece connector for a shock-absorbing frame of a bicycle to mitigate or obviate the aforementioned problems.

SUMMARY OF THE INVENTION

The main objective of the present invention is to provide a one-piece connector for a shock-absorbing frame of a bicycle that can simplify the production process, can improve the precision, quality, and appearance of the product, and can reinforce the structural strength of the one-piece connector.

The one-piece connector for a shock-absorbing frame of a bicycle in accordance with the present invention is manufactured by casting, forging or high pressure hydraulic forming means, is made of aluminum and formed as a single piece without welding, and has a bottom bracket shell, a connecting tube, a pivot and a linking joint. The bottom bracket shell is a transversal tube and has a top surface. The connecting tube is formed on and protrudes from the top surface of the bottom bracket shell and has an upper end. The pivot is formed with the connecting tube near the bottom bracket shell. The linking joint is formed on the upper end of the connecting tube. The bottom bracket shell, the connecting tube, the pivot and the linking joint are formed with each other to form the one-piece connector without welding.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
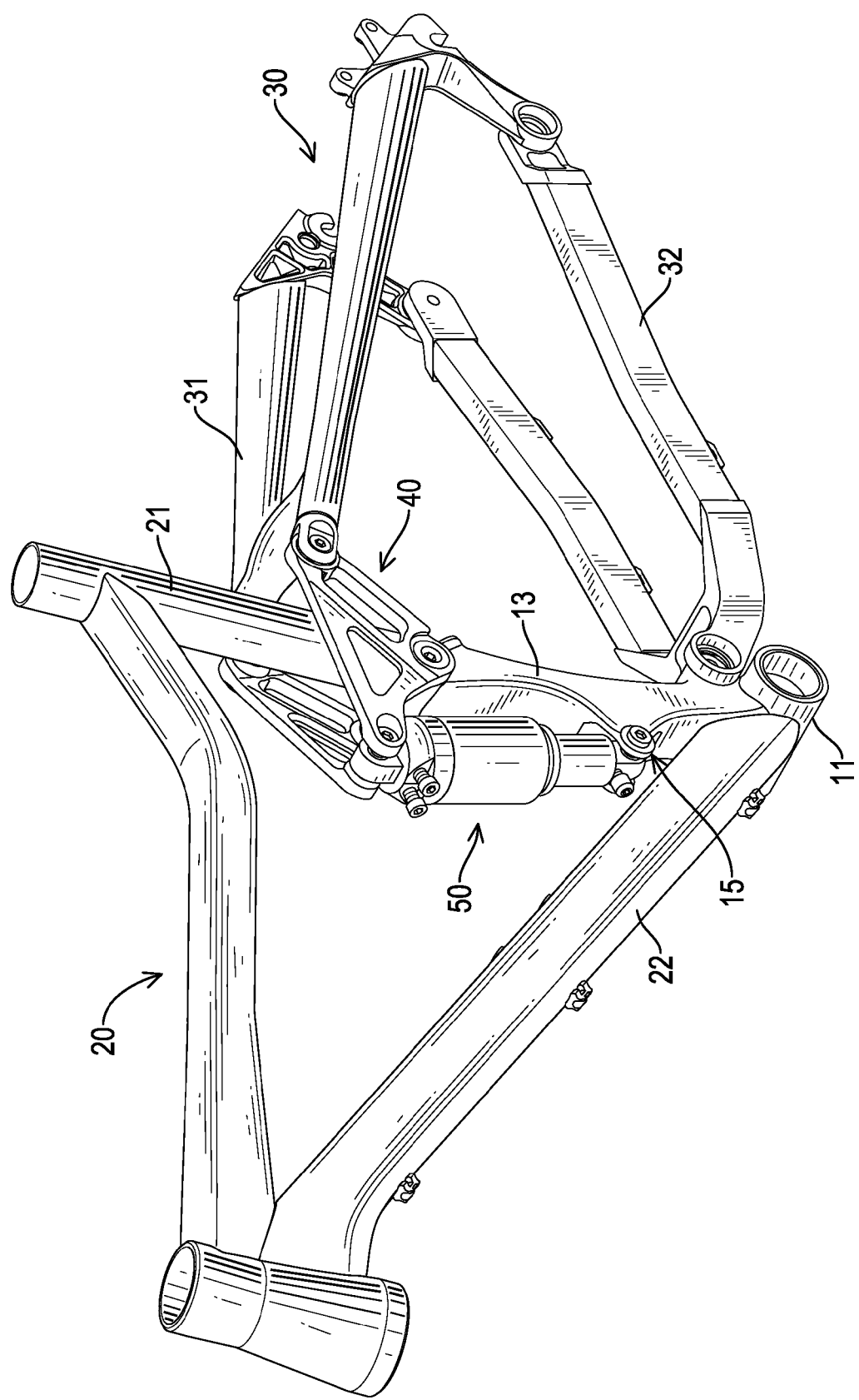
FIG. 1 is a perspective view of a first embodiment of a one-piece connector for a shock-absorbing frame of a bicycle in accordance with the present invention, mounted on a shock-absorbing frame.
Figure 2:
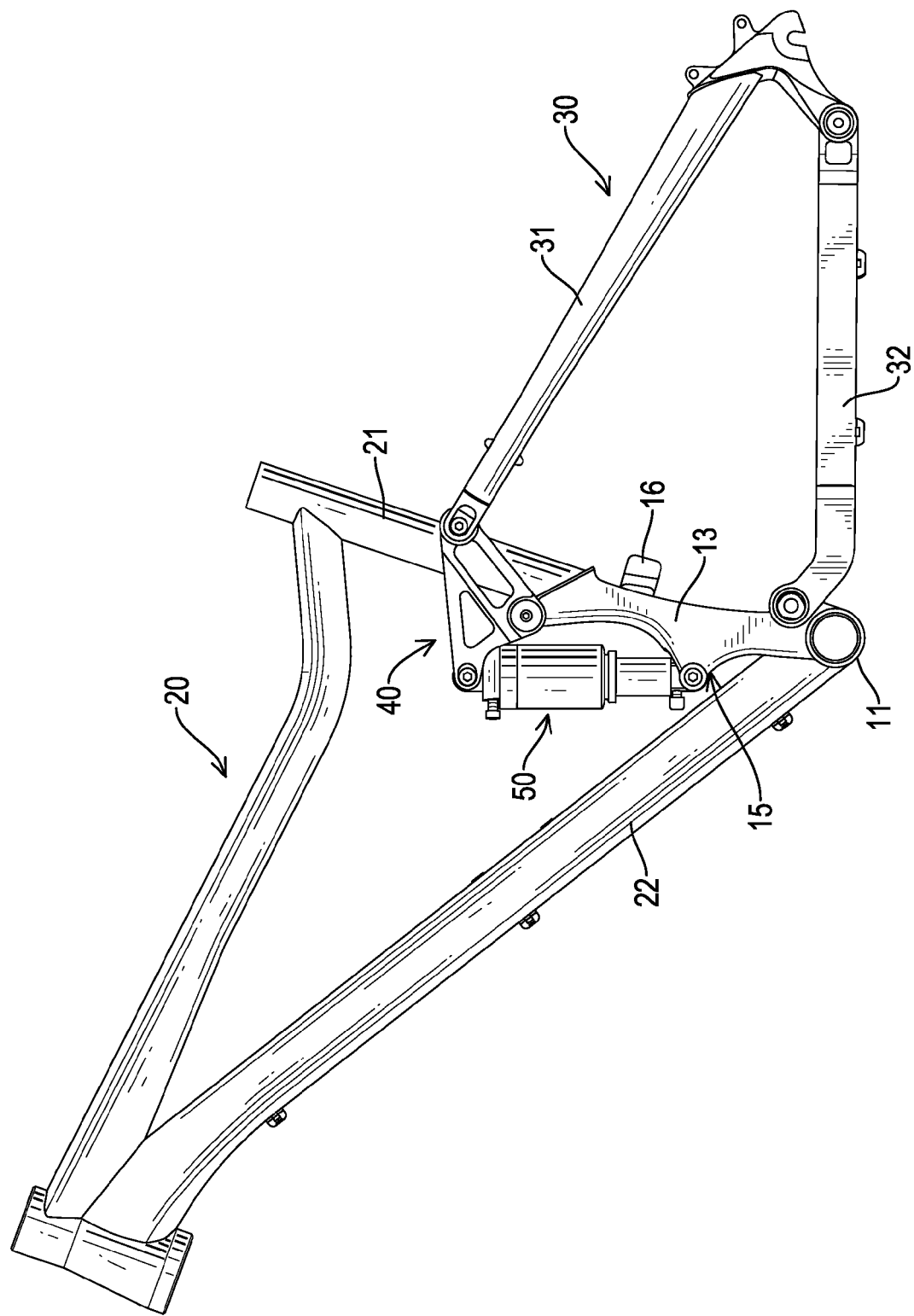
FIG. 2 is a side view of the one-piece connector for a shock-absorbing frame of a bicycle in FIG. 1.
Figure 3:
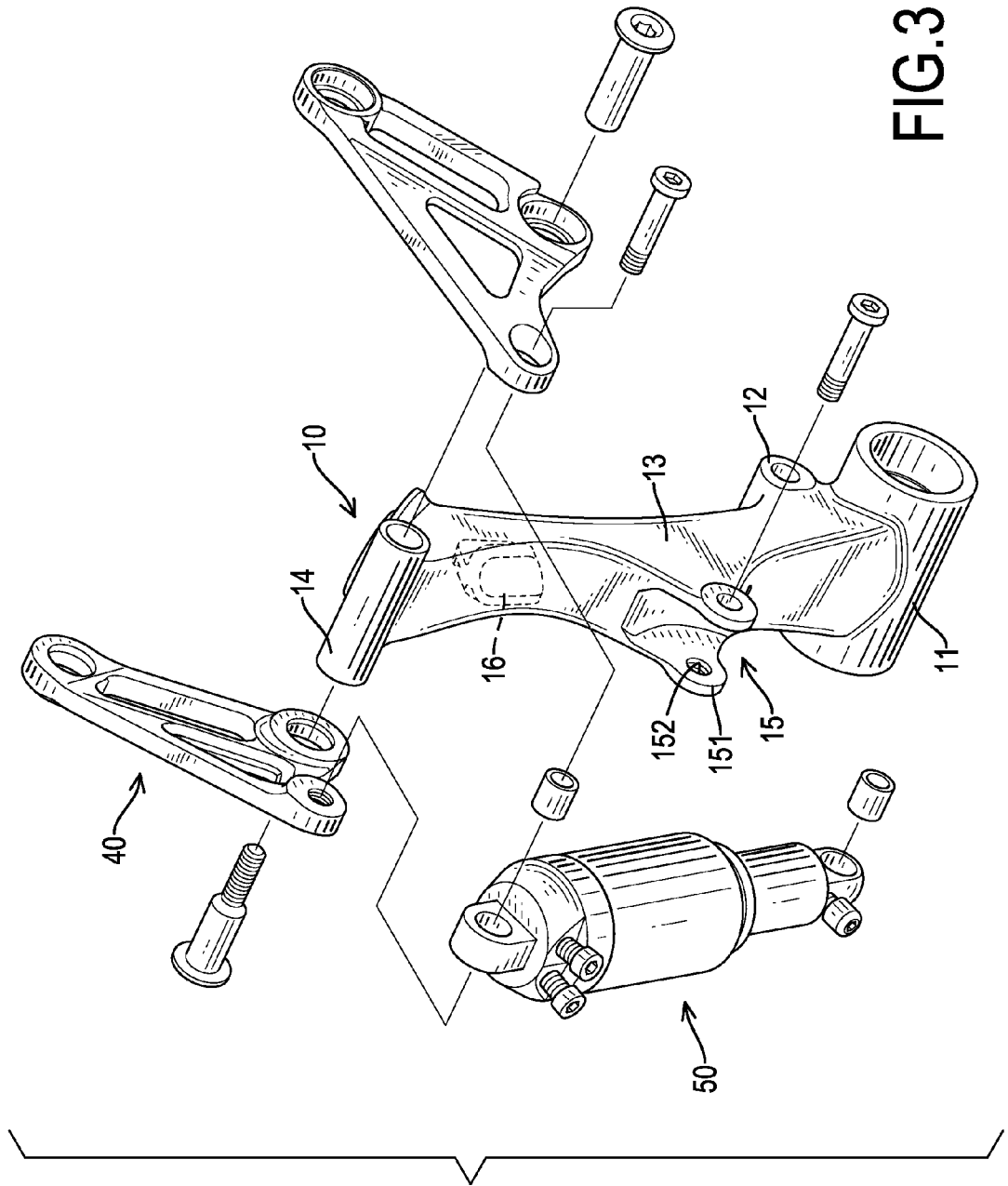
FIG. 3 is an enlarged and exploded perspective view of the one-piece connector for a shock-absorbing frame of a bicycle in FIG. 1.

With reference to FIGS. 1 to 3, a first embodiment of a one-piece connector 10 for a shock-absorbing frame of a bicycle in accordance with the present invention may be manufactured by casting, forging or high pressure hydraulic forming means, is made of aluminum and formed as a single piece without welding points, and comprises a bottom bracket shell 11, a pivot 12, a connecting tube 13 and a linking joint 14. This means that the four components, including the bottom bracket shell 11, the pivot 12, the connecting tube 13 and the linking joint 14, are formed as the single one-piece connector 10.

The bottom bracket shell 11 is a transversal tube and has a top surface. The pivot 12 may be a transversal tube and is formed on and protrudes from the top surface of the bottom bracket shell 11. The connecting tube 13 is formed on and protrudes from the top surface of the bottom bracket shell 11, is formed with the pivot 12 and has an upper end, a front side and a rear side. In addition, the pivot 12 is formed with the connecting tube 13 near the bottom bracket shell 11. Preferably, the connecting tube 13 is a closed tube.

The linking joint 14 may be a hollow tube and is transversally formed on the upper end of the connecting tube 13. Preferably, the one-piece connector 10 further has a cylinder mount 15 formed on and protruding from the front side of the connecting tube 13. The cylinder mount 15 has two connecting wings 151 formed on and protruding from the front side of the connecting tube 13 and being parallel to each other. Each one of the connecting wings 151 has a central protruding portion and a connecting hole 152 formed through the central protruding portion of the connecting wing 151. In addition, the one-piece connector 10 has a front derailleur 16 formed on and protruding from the rear side of the connecting tube 13.

For use, the first embodiment of the one-piece connector 10 in accordance with the present invention is assembled with a shock-absorbing frame. The shock-absorbing frame has a front frame 20, a rear frame 30, an upper connecting bracket 40 and a shock absorber 50. The front frame 20 has a seat tube 21 and a down tube 22. The rear frame 30 has a seat stay 31 and a chain stay 32. The upper connecting bracket 40 is connected to the seat stay 31 of the rear frame 30. The shock absorber 50 is pivotally connected to the upper connecting bracket 40. In assembly, the connecting tube 13 and the bottom bracket shell 11 are respectively connected to the seat tube 21 and the down tube 22 of the front frame 20. The linking joint 14 is pivotally connected to the upper connecting bracket 40 between the shock absorber 50 and the seat stay 31. The pivot 12 is connected to the chain stay 32. The connecting wings 151 of the cylinder mount 15 are connected to a lower end of the shock absorber 50 by bolts and nuts. Then, the one-piece connector 10 is assembled with the shock-absorbing frame.

Figure 4:
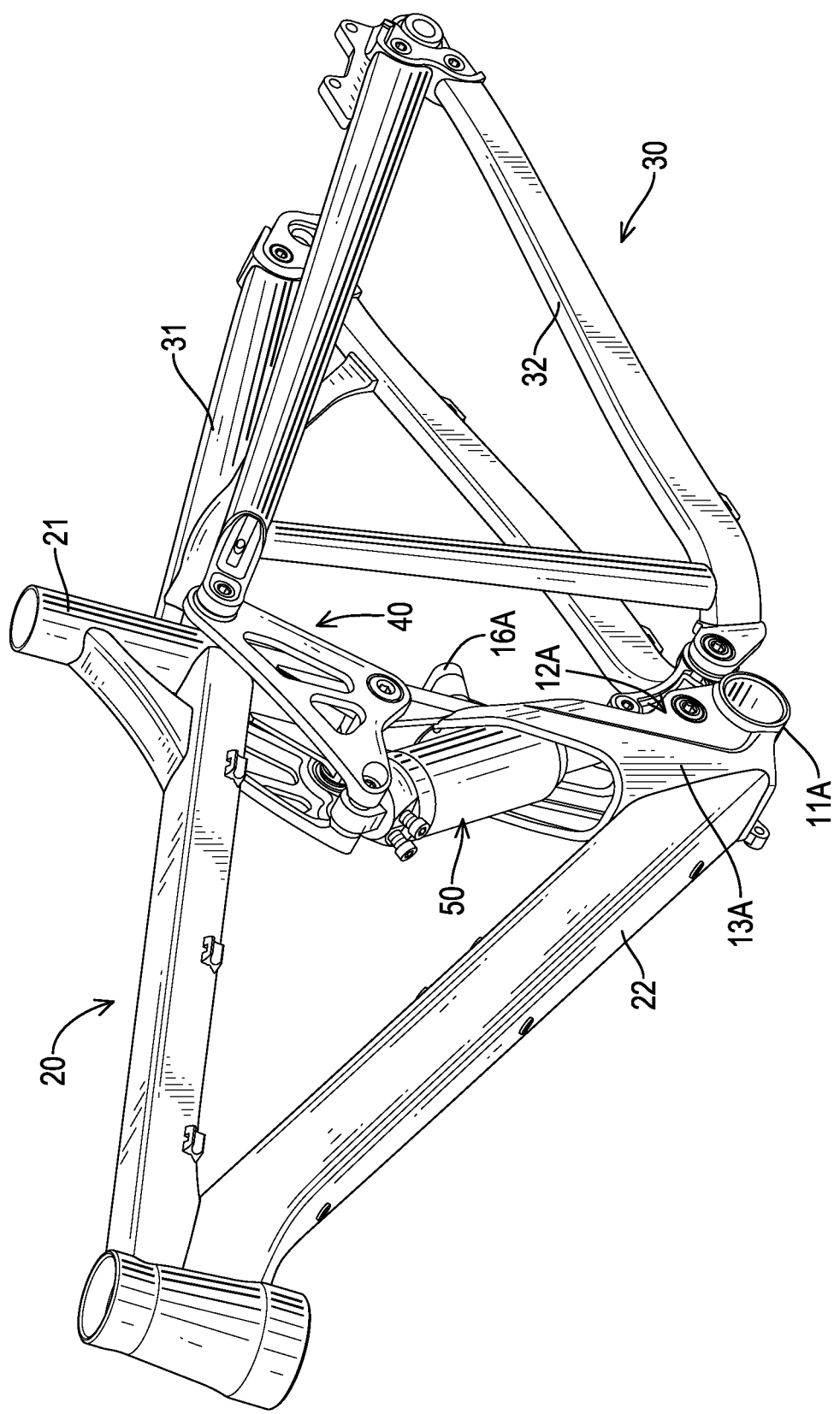
FIG. 4 is a perspective view of a second embodiment of a one-piece connector for a shock-absorbing frame of a bicycle in accordance with the present invention, mounted on a shock-absorbing frame.
Figure 5:
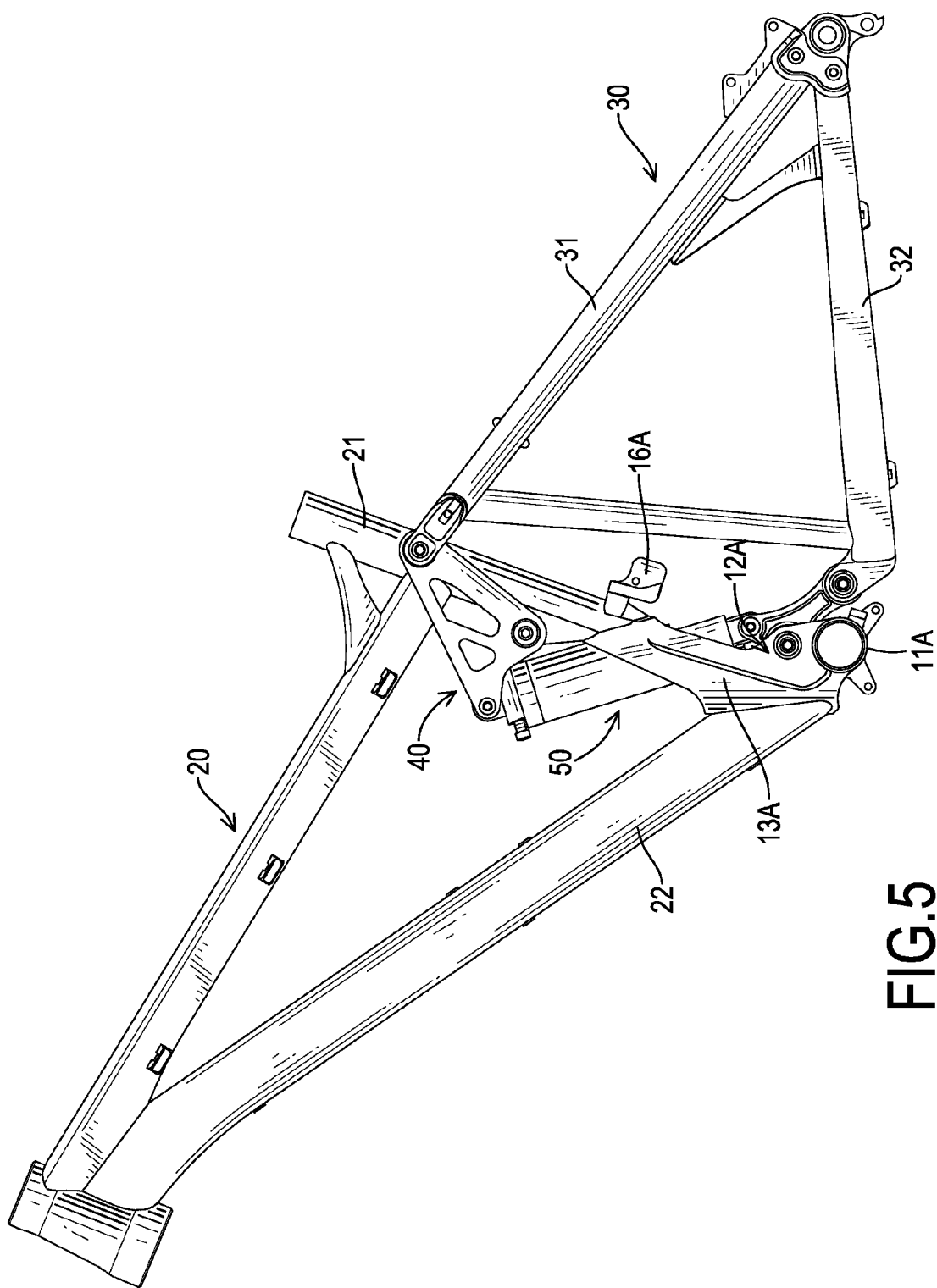
FIG. 5 is a side view of the one-piece connector for a shock-absorbing frame of a bicycle in FIG. 4.
Figure 6:
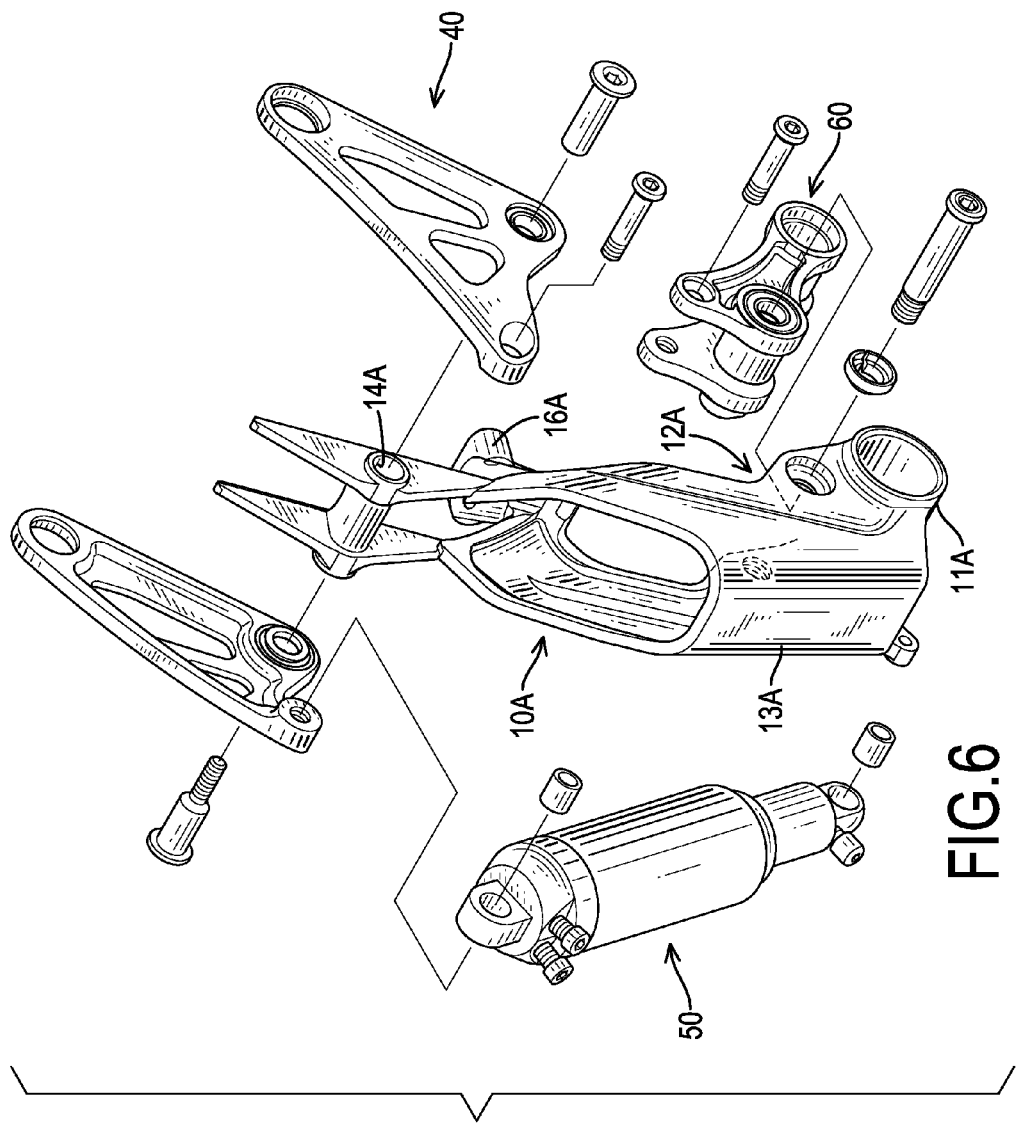
FIG. 6 is an enlarged and exploded perspective view of the one-piece connector for a shock-absorbing frame of a bicycle in FIG. 4.
Figure 7:
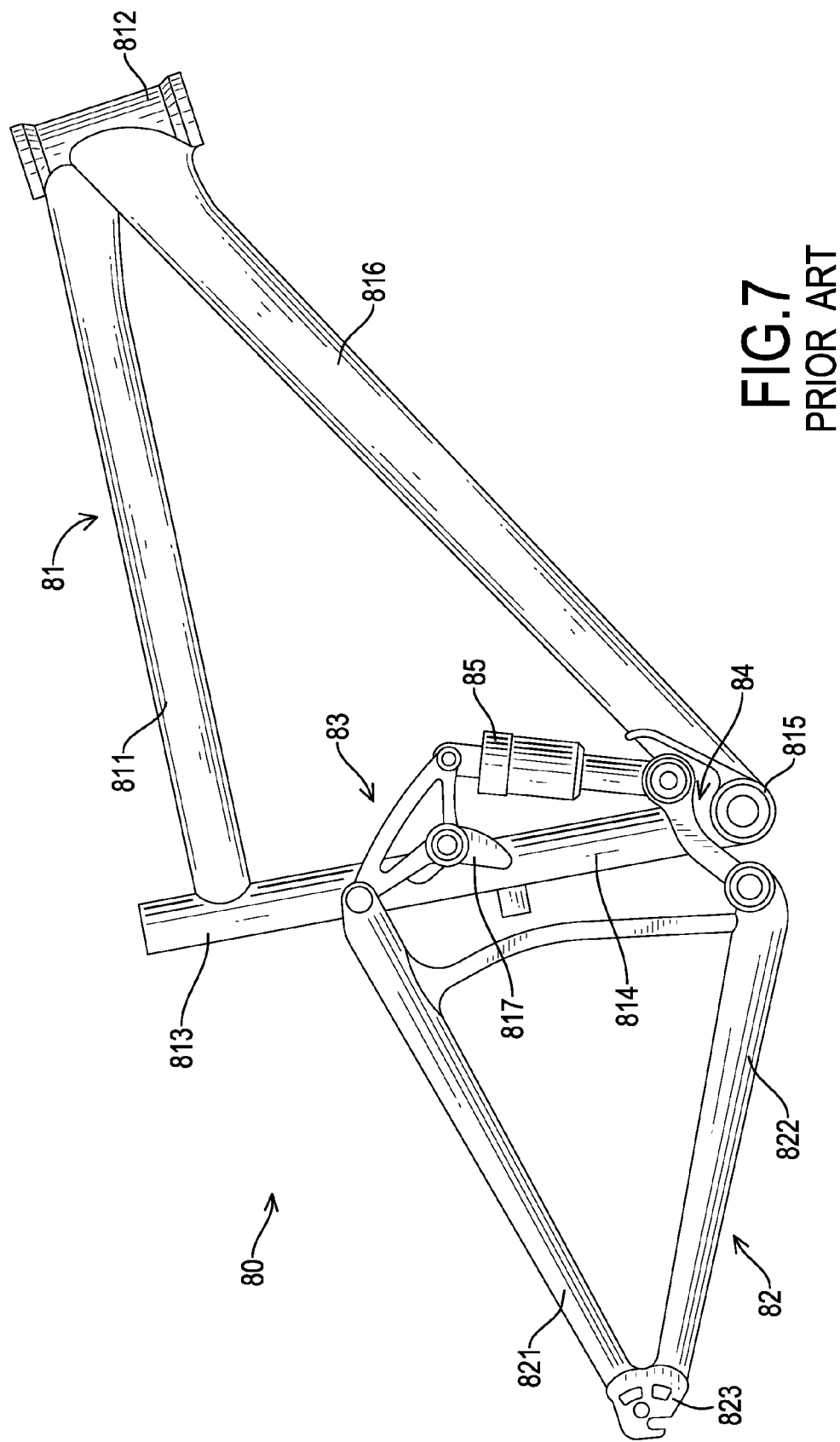
FIG. 7 is a side view of a shock-absorbing frame of a bicycle in accordance with the prior art.

With reference to FIGS. 4 to 6, a second embodiment of a one-piece connector 10A for a shock-absorbing frame of a bicycle in accordance with the present invention is made of aluminum and formed as a single piece without welding points, and comprises a bottom bracket shell 11A, a pivot 12A, a connecting tube 13A and a linking joint 14A to form the single one-piece connector 10A.

The bottom bracket shell 11A is a transversal tube and has a top surface. The pivot 12A may be composed by two parallel boards and is formed on and protrudes from the top surface of the bottom bracket shell 11A. The connecting tube 13A is formed on and protrudes from the top surface of the bottom bracket shell 11A, is formed with the parallel boards of the pivot 12A, and has an upper end and a rear side. Preferably, the connecting tube 13A is a hollow tube and has an opening formed through the upper end of the connecting tube 13A. The linking joint 14A may be a hollow tube and is transversally formed on the upper end of the connecting tube 13A. Furthermore, the one-piece connector 10A has a front derailleur 16A formed on and protruding from the rear side of the connecting tube 13 below the linking joint 14A.

For use, the second embodiment of the one-piece connector 10A in accordance with the present invention is assembled with a shock-absorbing frame. The shock-absorbing frame has a front frame 20, a rear frame 30, an upper connecting bracket 40, a lower connecting bracket 60 and a shock absorber 50. The front frame 20 has a seat tube 21 and a down tube 22. The rear frame 30 has a seat stay 31 and a chain stay 32. The upper connecting bracket 40 is connected to the seat stay 31 of the rear frame 30. The lower connecting bracket 60 is connected to the chain stay 32 of the rear frame 30. The shock absorber 50 is pivotally connected to the upper connecting bracket 40 and the lower connecting bracket 60.

In assembly, the connecting tube 13A is connected to the seat tube 21 and the down tube 22 of the front frame 20. The linking joint 14A is pivotally connected to the upper connecting bracket 40 between the shock absorber 50 and the seat stay 31. The parallel boards of the pivot 12A are connected to the lower connecting bracket 60 by bolts and nuts. Additionally, the shock absorber 50 is connected to the lower connecting bracket 60 via the opening of the connecting tube 13A. Then, the one-piece connector 10A is assembled into the shock-absorbing frame.

The one-piece connector 10, 10A for a shock-absorbing frame of a bicycle as described has the following advantages.

1. The bottom bracket shell 11, 11A, the cylinder mount 15, 15A, the pivot 12, 12A, the front derailleur 16, 16A, the linking joint 14, 14A and the connecting tube 13, 13A in accordance with the present invention are integrally formed with each other by casting, forging or high pressure hydraulic forming means to form a single one-piece connector 10, 10A without a welding process. Then, the one-piece connector 10, 10A can be mass-produced in large quantity to enhance the market competitiveness of the one-piece connector 10, 10A.

2. The one-piece connector 10, 10A for a shock-absorbing frame of a bicycle in accordance with the present invention can be manufactured without a welding process, and this can prevent the one-piece connector 10, 10A from deforming under the high temperature of the welding process and also can avoid the processing tolerances that are caused due to varying personal techniques and habits. Then, the precision and quality of the one-piece connector 10, 10A can be improved significantly.

3. The bottom bracket shell 11, 11A, the cylinder mount 15, 15A, the pivot 12, 12A, the front derailleur 16, 16A, the linking joint 14, 14A and the connecting tube 13, 13A are integrally formed with each other to form a single one-piece connector 10, 10A without a welding process, and the overall structural strength of the one-piece connector 10, 10A can be improved for safety in use.

4. The components including the bottom bracket shell 11, 11A, the cylinder mount 15, 15A, the pivot 12, 12A, the front derailleur 16, 16A, the linking joint 14, 14A and the connecting tube 13, 13A are integrated for a single one-piece connector 10, 10A, and this can simplify the structure of the one-piece connector 10, 10A and can integrate multiple functions to the one-piece connector 10, 10A.

5. The one-piece connector 10, 10A in accordance with the present invention is manufactured without welding, and there are no welding points and marks formed on the one-piece connector 10, 10A. Then, the appearance of the one-piece connector 10, 10A is simplistic and visually appealing.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A one-piece connector for a shock-absorbing frame of a bicycle, the one-piece connector being manufactured by casting, forging or high pressure hydraulic forming means, being made of aluminum and formed as a single piece without welding, and having:

a bottom bracket shell being a transversal tube and having a top surface;

a pivot being composed by two parallel boards and formed on and protruding from the top surface of the bottom bracket shell;

a connecting tube being a hollow tube, formed on and protruding from the top surface of the bottom bracket shell and formed with the parallel boards of the pivot, and having an upper end; and an opening formed through the upper end of the connecting tube; and a linking joint being a hollow tube, formed on the upper end of the connecting tube and;

the opening allowing a cylinder to pass through the connecting tube and connect to a lower connecting bracket; the lower connecting bracket being pivotally connected to the pivot within the parallel boards; and a front derailleur formed on and protruding from a rear side of the connecting tube.

\* \* \* \* \*